(12) United States Patent
Kim

(10) Patent No.: US 11,108,114 B2
(45) Date of Patent: Aug. 31, 2021

(54) BATTERY MODULE FOR SUPPLYING POWER FOR EMERGENCY CALL

(71) Applicant: LG CHEM, LTD., Seoul (KR)

(72) Inventor: Sang Jin Kim, Cheongju-Si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/805,189

(22) Filed: Feb. 28, 2020

(65) Prior Publication Data

US 2020/0203681 A1 Jun. 25, 2020

Related U.S. Application Data

(63) Continuation of application No. PCT/KR2018/009475, filed on Aug. 17, 2018.

(30) Foreign Application Priority Data

Aug. 30, 2017 (KR) .................. 10-2017-0110392

(51) Int. Cl.
*H01M 50/213* (2021.01)
*H01M 10/42* (2006.01)
(Continued)

(52) U.S. Cl.
CPC ......... *H01M 50/213* (2021.01); *H01M 10/42* (2013.01); *H01M 50/107* (2021.01);
(Continued)

(58) Field of Classification Search
CPC ............. H01M 50/213; H01M 50/107; H01M 50/543; H01M 50/572; H01M 10/42; H01M 2200/106; H01M 2220/30; H04M 11/00

See application file for complete search history.

(56) References Cited

U.S. PATENT DOCUMENTS

| 6,440,601 B1 | 8/2002 | Aoi et al. | |
| 6,503,647 B1 * | 1/2003 | Sugiyama | H01M 50/502 |
| | | | 429/7 |

(Continued)

FOREIGN PATENT DOCUMENTS

| JP | 3863693 B2 | 12/2006 |
| JP | 2008-98706 A | 4/2008 |

(Continued)

OTHER PUBLICATIONS

Extended European Search Report for European Application No. 18851878.1 dated Jun. 30, 2020.

(Continued)

*Primary Examiner* — Stewart A Fraser
(74) *Attorney, Agent, or Firm* — Birch, Stewart, Kolasch & Birch, LLP

(57) ABSTRACT

A battery module having first and second cylindrical battery cells, each of the first and second cylindrical battery cells having a negative electrode terminal and a positive electrode terminal, a metal plate configured to connect, in series, the first cylindrical battery cell and the second cylindrical battery cell, a shrinkable tube in which the first and second cylindrical battery cells are mounted, first and second PTC elements respectively provided to the first and second cylindrical battery cells, first insulating members provided between the first and second PTC elements and the shrinkable tube, second insulating members respectively provided between the first and second PTC elements and the first and second cylindrical battery cells, insulating sheets respectively configured to seal an upper surface and a lower surface of the shrinkable tube, and a connection part protruding outward from the shrinkable tube and configured to connect the first and second cylindrical battery cells to an external electronic apparatus in provided.

10 Claims, 3 Drawing Sheets

(51) Int. Cl.
*H01M 50/107* (2021.01)
*H01M 50/543* (2021.01)
*H01M 50/572* (2021.01)
*H04M 11/00* (2006.01)

(52) U.S. Cl.
CPC ....... *H01M 50/543* (2021.01); *H01M 50/572* (2021.01); *H04M 11/00* (2013.01); *H01M 2200/106* (2013.01); *H01M 2220/30* (2013.01)

(56) References Cited

U.S. PATENT DOCUMENTS

| | | |
|---|---|---|
| 8,207,633 B2 | 6/2012 | Oleksiewicz |
| 10,211,435 B2 | 2/2019 | Miyao |
| 2009/0209225 A1 | 8/2009 | Sakai et al. |
| 2015/0246650 A1 | 9/2015 | Nakajima et al. |
| 2016/0127879 A1 | 5/2016 | Jung |
| 2018/0226628 A1 | 8/2018 | Takasu et al. |

FOREIGN PATENT DOCUMENTS

| | | |
|---|---|---|
| JP | 2010-140783 A | 6/2010 |
| JP | 5334482 B2 | 11/2013 |
| JP | 2015-11850 A | 1/2015 |
| JP | 2015-130288 A | 7/2015 |
| JP | 2017-69098 A | 4/2017 |
| KR | 10-2015-0106604 A | 9/2015 |
| KR | 10-2016-0102725 A | 8/2016 |

OTHER PUBLICATIONS

International Search Report (PCT/ISA/210) issued in PCT/KR2018/009475, dated Nov. 23, 2018.

\* cited by examiner (a)  (b)

BATTERY MODULE FOR SUPPLYING POWER FOR EMERGENCY CALL

CROSS-REFERENCE TO RELATED APPLICATIONS

The present application is a By-Pass Continuation of International Application No. PCT/KR2018/009475, filed in the Republic of Korea on Aug. 17, 2018, and claims the benefit of priority to Korean Application No. 10-2017-0110392, filed in the Republic of Korea on Aug. 30, 2017, both of which are herein incorporated by reference in their entireties.

TECHNICAL FIELD

The present invention relates to a battery module for supplying power to an emergency telephone.

More specifically, the present invention relates to a battery module which is for supplying power to an emergency telephone and has an increased output and use time compared to conventional battery modules.

BACKGROUND ART

Recently, there have been developed techniques for automatically making an emergency telephone call to report an accident and request rescue at the time of the accident.

Such an emergency telephone uses a separate emergency battery upon a car accident in preparation for a situation in which power supply is interrupted due to a problem occurring in a battery that is mounted on a vehicle that normally supplies power to various electrical devices.

In addition, conventional emergency batteries are formed by a single cylindrical battery cell and generally have difficulty in producing an output of 4 W or greater, and a limitation in time for using an emergency call.

Thus, the present invention proposes a battery module for solving the problem of insufficient output and short use time in typical batteries.

DISCLOSURE OF THE INVENTION

Technical Problem

The present invention provides a battery module which is for supplying power to an emergency telephone and has an increased output and use time.

Technical Solution

In accordance with an embodiment of the present invention, a battery module includes: first and second cylindrical battery cells, each of the first and second battery cells having a negative electrode terminal and a positive electrode terminal; a metal plate configured to connect, in series, the first cylindrical battery cell and the second cylindrical battery cell; a shrinkable tube in which the first and second cylindrical battery cells are mounted; first and second positive temperature coefficient (PTC) elements respectively provided to the first and second cylindrical battery cells; first insulating members respectively provided between the first and second PTC elements and the shrinkable tube; second insulating members respectively provided between the first and second PTC elements and the respective first and second cylindrical battery cells; insulating sheets respectively configured to seal an upper surface and a lower surface of the shrinkable tube; and a connection part protruding outward from the shrinkable tube and configured to connect the first and second cylindrical battery cells to an external electronic apparatus.

More specifically, the shrinkable tube may have opening parts, through which the first and second cylindrical battery cells are respectively inserted, the opening parts being formed on the upper surface and the lower surface of the shrinkable tube, and the first and second cylindrical battery cells may be arranged side by side to be in close contact with or adjacent to each other, and arranged such that the positive electrode terminal and the negative electrode terminal of the first cylindrical battery cell and the positive electrode terminal and the negative electrode terminal of the second cylindrical battery cell may face directions different from each other.

In addition, the first and second PTC elements have "]"-shaped bent structures so that first ends of the first and second PTC elements are connected to the positive electrode terminals or the negative electrode terminals of the respective first and second cylindrical battery cells and second ends of the first and second PTC elements are connected to side surfaces of the respective first and second cylindrical battery cells In addition, the second insulating members may have same bent structures as the "]"-shaped bent structures of the first and second PTC elements, and the second insulating members may be provided on at least portions of the first and second cylindrical battery cells to insulate the first and second PTC elements and the respective first and second cylindrical battery cells.

In addition, the first insulating member may be provided on upper portions of the first and second PTC elements and at least portions of the respective first and second cylindrical battery cells, the first insulating members have curved surfaces in contact with the respective first and second cylindrical battery cells, and the first insulating members insulate the shrinkable tube and the first and second PTC elements.

In addition, the insulating sheets may have same shapes as shapes of the opening parts provided in each of the upper and lower surfaces of the shrinkable tube, and the insulating sheets insulate the upper and lower portions of the first and second cylindrical battery cells in portions except for the connection part protruding outward from the shrinkable tube.

In addition, the connection part may include: a first wire connected to one end of the first PTC element; a second wire connected to one end of the second PTC element; and a third wire connected to the metal plate, and the first, second, and third wires may be connected to the external apparatus through a single connector.

In addition, the connection part may further include a cushion tape configured to surround portions of the first to third wires and a thermistor having a different amount of electron flow according to a rise in the temperature of the thermistor element, and the thermistor may be insulated from the shrinkable tube by means of an insulating tape.

In addition, the metal plate may include: a first contact end connected to one of the positive electrode terminal or the negative electrode terminal of the first cylindrical battery cell; a second contact end connected to another of the positive electrode terminal or the negative electrode terminal of the second cylindrical battery cell; and a wire connection end connected to the third wire, wherein the first contact end and the second contact end may be provided on a plane parallel to the positive electrode terminal or the negative electrode terminal of the first cylindrical battery cell, and the wire connection end may be provided in a direction perpendicular to the plane on which the first contact end and the second contact end are provided.

In addition, at least portions of the region, in which the first and second PTC elements are bent in "]"-shapes, may be further provided with third insulating members provided along the bent surfaces of the first and second PTC elements.

Advantageous Effects

The present invention can supply a high output to an emergency telephone by using an emergency telephone power supply battery module which has an increased output.

In addition, the present invention allows an emergency telephone to be used for a longer time period by using an emergency telephone power supply battery module which has increased use time.

MODE FOR CARRYING OUT THE INVENTION

Figure 1:
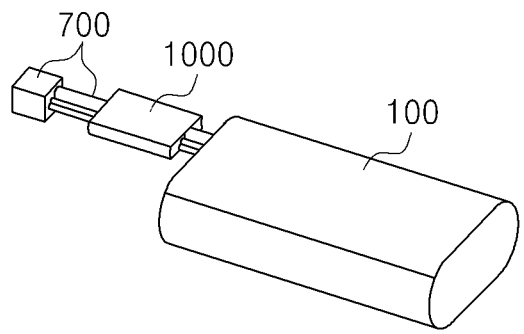
FIG. 1 shows a shape of a final product of a battery module according to an embodiment of the present invention.

Hereinafter, embodiments of the present disclosure will be described in detail with reference to the accompanying drawings so that the present disclosure may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and like reference numerals in the drawings denote like elements.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. In the following description, the technical terms are used only for explaining a specific exemplary embodiment while not limiting the present disclosure. The terms of a singular form may include plural forms unless referred to the contrary.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). Furthermore, when it is described that one part "includes" some components, it does not mean that other components are excluded but means that other elements may be further included if there is no specific contrary indication. The terms "step of (performing)" or "step of (doing)" used in the entire specification of the present disclosure does not mean "step for".

Terms used in the present invention is selected as general terms as widely used as possible while considering functions in the present invention, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present invention. Accordingly, the terms used in the present invention should be defined on the basis of the meanings the terms have and the contents of the entirety of the present invention rather than defined by simple names of the terms.

Figure 2:
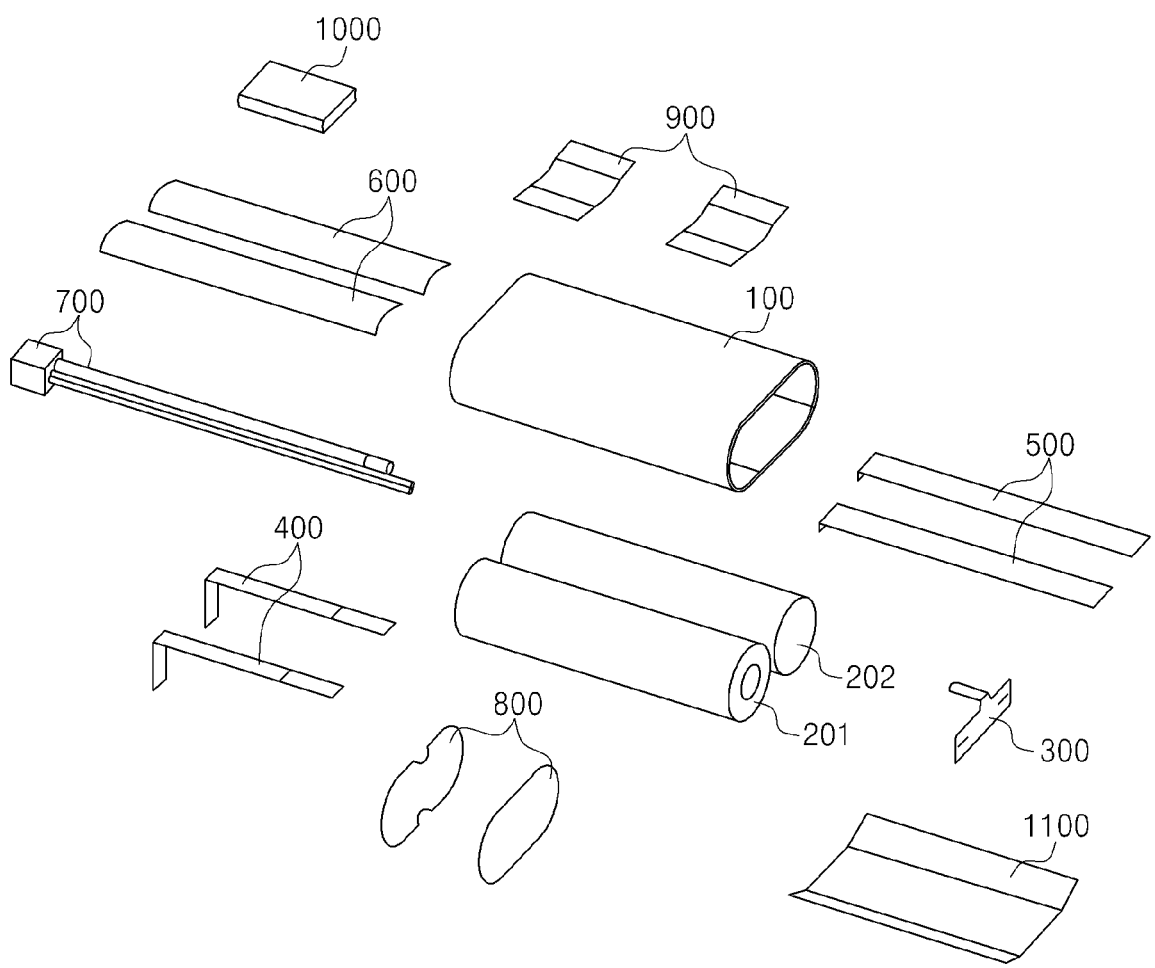
FIG. 2 is an exploded view of a battery module according to an embodiment of the present invention.

FIG. 1 shows a shape of a final product of an emergency telephone power supply battery module according to an embodiment of the present invention, and FIG. 2 is an exploded view of an emergency telephone power supply battery module according to an embodiment of the present invention.

Hereinafter with reference to FIGS. 1 and 2, an emergency telephone power supply battery module according to an embodiment the present invention will be described.

A battery module according to an embodiment of the present invention, may include: first and second cylindrical battery cells 201 and 202 each of which is provided with a negative electrode terminal and a positive electrode terminal; a metal plate 300 configured to connect, in series, the first cylindrical battery cell 201 and the second cylindrical battery cell 202; a shrinkable tube 100 in which the first and second cylindrical battery cells 201 and 202 are mounted; PTC elements 400 provided to the respective first and second cylindrical battery cells 201 and 202; first insulating members 600 provided between the PTC elements 400 and the shrinkable tube 100; second insulating members 500 respectively provided between the PTC elements 400 and the first and second cylindrical battery cells; insulating sheets 800 respectively configured to seal an upper surface and a lower surface of the shrinkable tube 100; and a connection part 700 protruding outward from the shrinkable tube 100 and configured to connect the first and second cylindrical battery cells 201 and 202 and an external electronic apparatus More specifically, the shrinkable tube 100 may have, on each of the upper surface and the lower surface thereof, opening parts in which the first and second cylindrical battery cells 201 and 202 can be inserted.

In addition, the first and second cylindrical battery cells 201 and 202 are arranged side by side to be in close contact with or adjacent to each other in the shrinkable tube 100, and the positive electrode terminal and the negative electrode terminal of the first cylindrical battery cell 201 and the positive electrode terminal and the negative electrode terminal of the second cylindrical battery cell 202 may be arranged to face directions different from each other. This arrangement is provided to easily connect, in series, the first and second cylindrical battery cells 201 and 202 by using the metal plate 300 to be described later.

Figure 3:
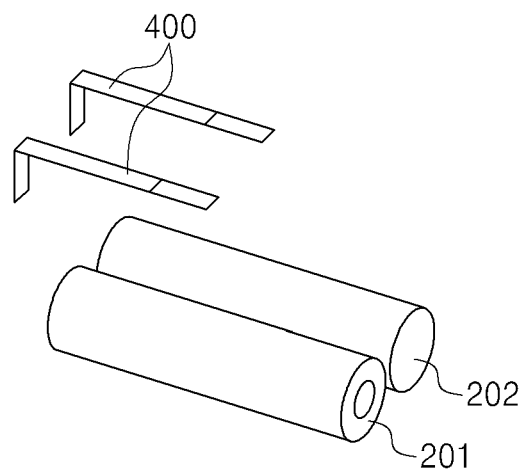
FIG. 3 is a view illustrating a specific shape of PTC elements of a battery module according to an embodiment of the present invention.
Figure 4:
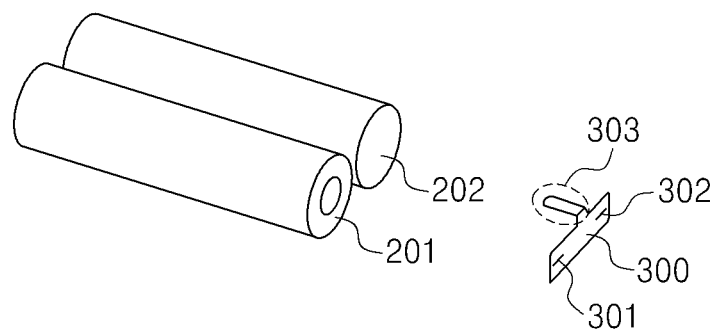
FIG. 4 is a view illustrating a specific shape of a metal plate of a battery module according to an embodiment of the present invention.

In addition, the PTC elements 400 provided to each of the first and second cylindrical battery cells 201 and 202 may have a "]"-shaped bent structure so that, as illustrated in FIG. 3, first ends of the PTC elements are connected to the corresponding positive or the negative electrode terminals of the first and second cylindrical battery cells 201 and 202, and the second ends of the PTC elements are connected to side surfaces of the first and second cylindrical battery cells 201 and 202.

The PTC elements 400 formed, as such, in a "]"-shaped bent structure are provided be in close contact with the first and second cylindrical battery cells 201 and 202, and thus, minimizes the amount of space used in the shrinkable tube 100.

In addition, the members that insulate the PTC elements 400 having the "]"-shaped bent structure from the first and second cylindrical battery cells 201 and 202 are the second insulating member 500.

Figure 5:
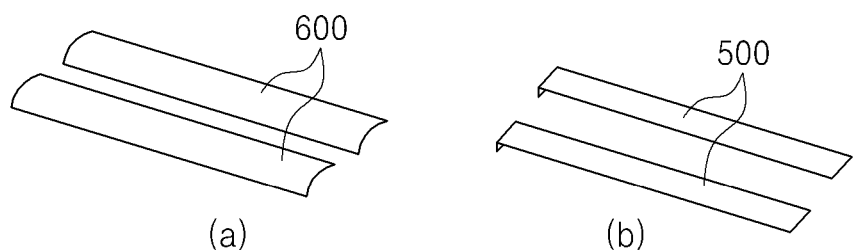
FIG. 5 is a view specifically illustrating shapes of first insulating members and second insulating members of a battery module according to an embodiment of the present invention.
Figure 6:
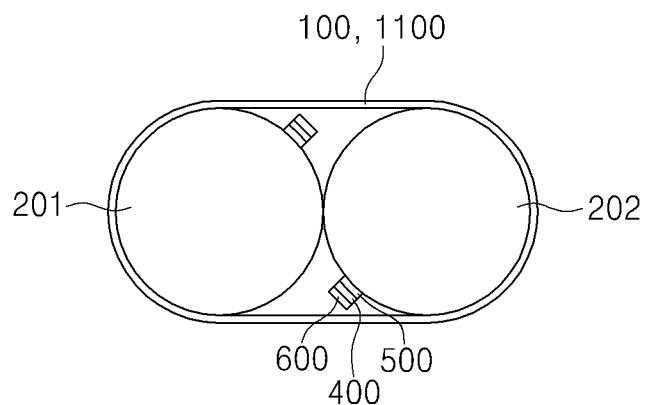
FIG. 6 is a cross-sectional view of the battery module according to an embodiment of the present invention.
Figure 7:
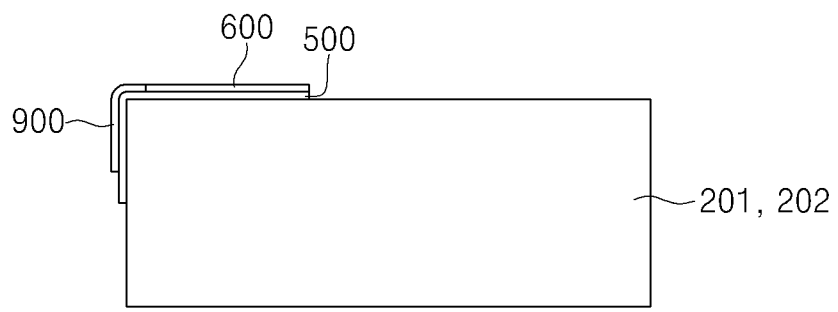
FIG. 7 is a view illustrating the arrangement of the first, second and third insulating members of a battery module according to an embodiment of the present invention.

More specifically, referring to FIGS. 5-7, the second insulating members 500 will be described. The second insulating members 500 may have the same "]"-shaped bent structure as the PTC elements 400, and the second insulating members 500 may be provided in at least a portion of regions in the first and second cylindrical battery cells 201 and 202 and thereby insulate the PTC elements 400 and the first and second cylindrical battery cells 201 and 202.

In addition, the first insulating members 600 which insulate the shrinkable tube 100 and the PTC elements 400 may be provided on upper portions of the PTC elements 400 and at least a portion of each of the first and second cylindrical battery cells 201 and 202. The first insulating members 600 provided as such may have curved structures so as to be in close contact with the first and second cylindrical battery cells 201 and 202.

In this embodiment, the coupling structure in order from innermost structure to outermost structure is the first and second cylindrical battery cells 201 and 202, the second insulating members 500, the PTC elements 400, the first insulating members 600, and the shrinkable tube 100.

In addition, at least portions of regions in which the PTC elements 400 are bent in a "]"-shape may be further provided with third insulating members 900 respectively provided along the bent surface of the PTC elements 400.

The third insulating members 900 provided as such may insulate the bent surfaces of the PTC elements which are difficult to be insulated by the first insulating members 600.

In addition, the insulating sheets 800 may have the same shapes as the shapes of the opening parts provided in the upper surface and the lower surface of the shrinkable tube 100, and the insulating sheets 800 may insulate the upper and lower portions of the first and second cylindrical battery cells 201 and 202 except for the portion at which the connection part 700 protrudes to the outside.

Figure 8:
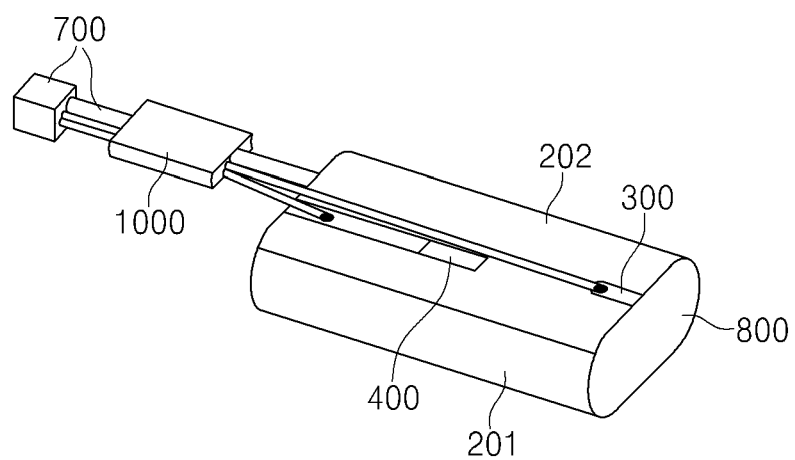
FIG. 8 is a view illustrating a battery module according to an embodiment of the present invention with the shrinkable tube removed.

In addition, as shown in FIG. 8, the connection part 700 may include a first wire connected to one end of the PTC element 400 provided on the first cylindrical battery cell 201, a second wire connected to one end of the PTC element 400 provided on the second cylindrical battery cell 202, and a third wire connected to the metal plate 300.

In addition, the first to third wires may be connected to an external electronic apparatus through a single connector.

In addition, the connection part 700 may further include a thermistor element having an amount of current flow that varies according to temperature rise in a cushion tape 1000 surrounding a portion of the first to third wires and the thermistor element.

The thermistor element may be connected to the ends of one or more wires among the first to third wires and may be insulated from the shrinkable tube by an insulating tape.

In addition, the metal plate 300 may include: a first contact end 301 connected to the positive electrode terminal or the negative electrode terminal of the first cylindrical battery cell 201; a second contact end 302 connected to the positive electrode terminal or the negative electrode terminal of the second cylindrical battery cell 202; and a wire connection end 303 connected to the third wire.

More specifically, the first contact end 301 and the second contact end 302 may be formed on a plane parallel to the negative electrode terminal or the positive electrode terminal of the first cylindrical battery cell 201, and the wire connection end 303 may be provided in a direction perpendicular to the plane on which the first contact end 301 and the second contact end 302 are provided.

In addition, a label 1100 on which information about the battery module is printed may be attached on a portion of the outer surface of the shrinkable tube 100.

Although the technical idea of the present invention has been specifically described with respect to the above embodiments, it should be noted that the foregoing embodiments are provided only for illustration while not limiting the present disclosure. In addition, various embodiments may be provided to allow those skilled in the art to understand the scope of the preset invention.

What is claimed is:

1. A battery module comprising:
   first and second cylindrical battery cells, each of the first and second cylindrical battery cells having a negative electrode terminal and a positive electrode terminal;
   a metal plate configured to connect, in series, the first cylindrical battery cell and the second cylindrical battery cell;
   a shrinkable tube in which the first and second cylindrical battery cells are mounted;
   first and second positive temperature coefficient (PTC) elements respectively provided to the first and second cylindrical battery cells;
   first insulating members provided between the first and second PTC elements and the shrinkable tube;
   second insulating members respectively provided between the first and second PTC elements and the respective first and second cylindrical battery cells;
   insulating sheets respectively configured to seal an upper surface and a lower surface of the shrinkable tube; and
   a connection part protruding outward from the shrinkable tube and configured to connect the first and second cylindrical battery cells to an external electronic apparatus.

2. The battery module of claim 1, wherein the shrinkable tube has opening parts, through which the first and second cylindrical battery cells are respectively inserted, the opening parts being formed on the upper surface and the lower surface of the shrinkable tube, and the first and second cylindrical battery cells are arranged side by side to be in close contact with or adjacent to each other, and arranged such that the positive electrode terminal and the negative electrode terminal of the first cylindrical battery cell and the positive electrode terminal and the negative electrode terminal of the second cylindrical 3. The battery module of claim 2, wherein the insulating sheets have same shapes as shapes of the opening parts formed in each of the upper and lower surfaces of the shrinkable tube, and the insulating sheets insulate the first and second cylindrical battery cells. battery cell face directions different from each other.

4. The battery module of claim 1, wherein the first and second PTC elements have "⏋"-shaped bent structures so that first ends of the first and second PTC elements are connected to the positive electrode terminals or the negative electrode terminals of the respective first and second cylindrical battery cells and second ends of the first and second PTC elements are connected to side surfaces of the respective first and second cylindrical battery cells.

5. The battery module of claim 4, wherein the second insulating members have same bent structures as the "⏋"-shaped bent structures of the PTC elements, and the second insulating members are provided on at least portions of the first and second cylindrical battery cells to insulate the first and second PTC elements and the respective first and second cylindrical battery cells.

6. The battery module of claim 3, wherein at least portions of a region, in which the first and second PTC elements are bent in "⏋"-shapes, are further provided with third insulating members provided along the respective bent surfaces of the first and second PTC elements.

7. The battery module of claim 1, wherein the first insulating members are provided on upper portions of the first and second PTC elements and at least portions of the respective first and second cylindrical battery cells, the first insulating members have curved surfaces in contact with the respective first and second cylindrical battery cells, and the first insulating members insulate the shrinkable tube and the first and second PTC elements.

8. The battery module of claim 1, wherein the connection part comprises:

a first wire connected to one end of the first PTC element provided on an upper portion of the first cylindrical battery cell;

a second wire connected to one end of the second PTC element provided on an upper portion of the second cylindrical battery cell; and a third wire connected to the metal plate, and wherein the first, second, and third wires are connected to the external apparatus through a single connector.

9. The battery module of claim 8, wherein the connection part further comprises:

a cushion tape configured to surround portions of the first to third wires; and a thermistor element having a different amount of electron flow according to a rise in the temperature of the thermistor element, wherein the thermistor element is insulated from the shrinkable tube by means of an insulating tape.

10. The battery module of claim 8, wherein the metal plate comprises:

a first contact end connected to one of the positive electrode terminal or the negative electrode terminal of the first cylindrical battery cell;

a second contact end connected to another of the positive electrode terminal or the negative electrode terminal of the second cylindrical battery cell; and a wire connection end connected to the third wire, wherein the first contact end and the second contact end are provided on a plane parallel to the positive electrode terminal or the negative electrode terminal of the first cylindrical battery cell, and the wire connection end is provided in a direction perpendicular to the plane on which the first contact end and the second contact end are provided.

* * * * *